Patented Apr. 29, 1947

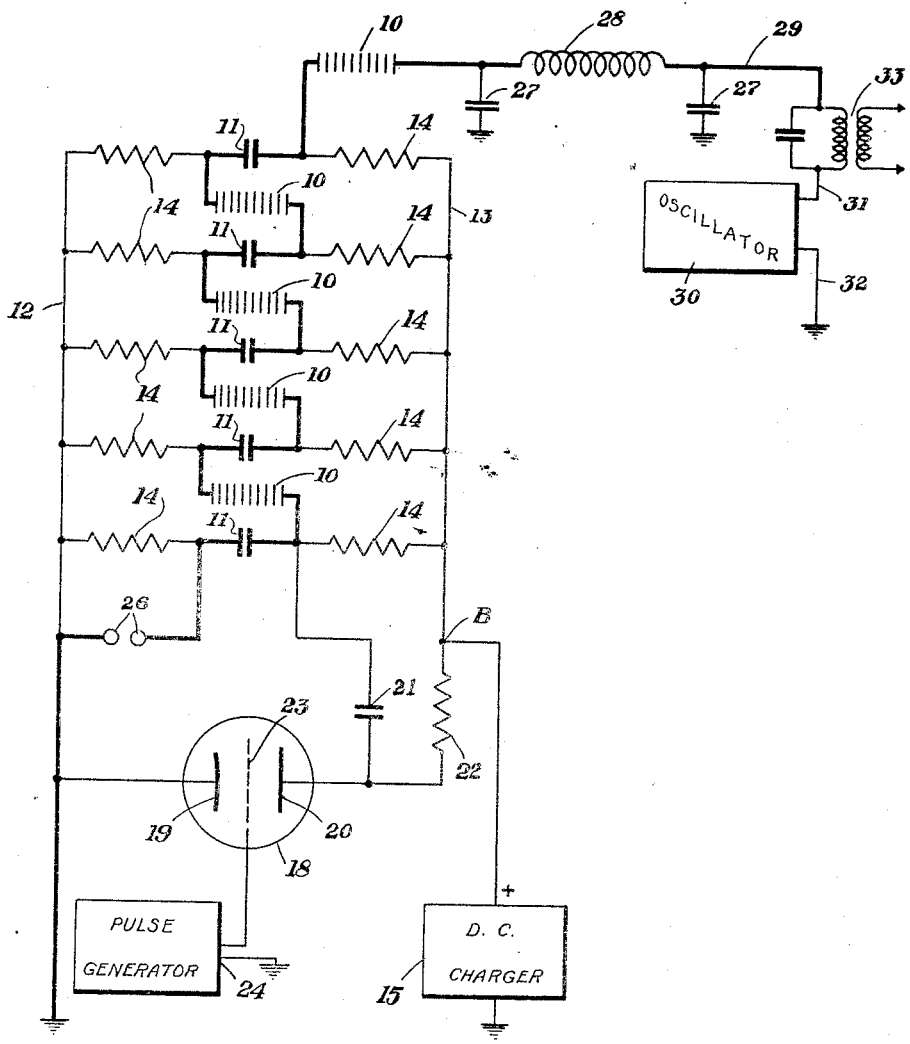

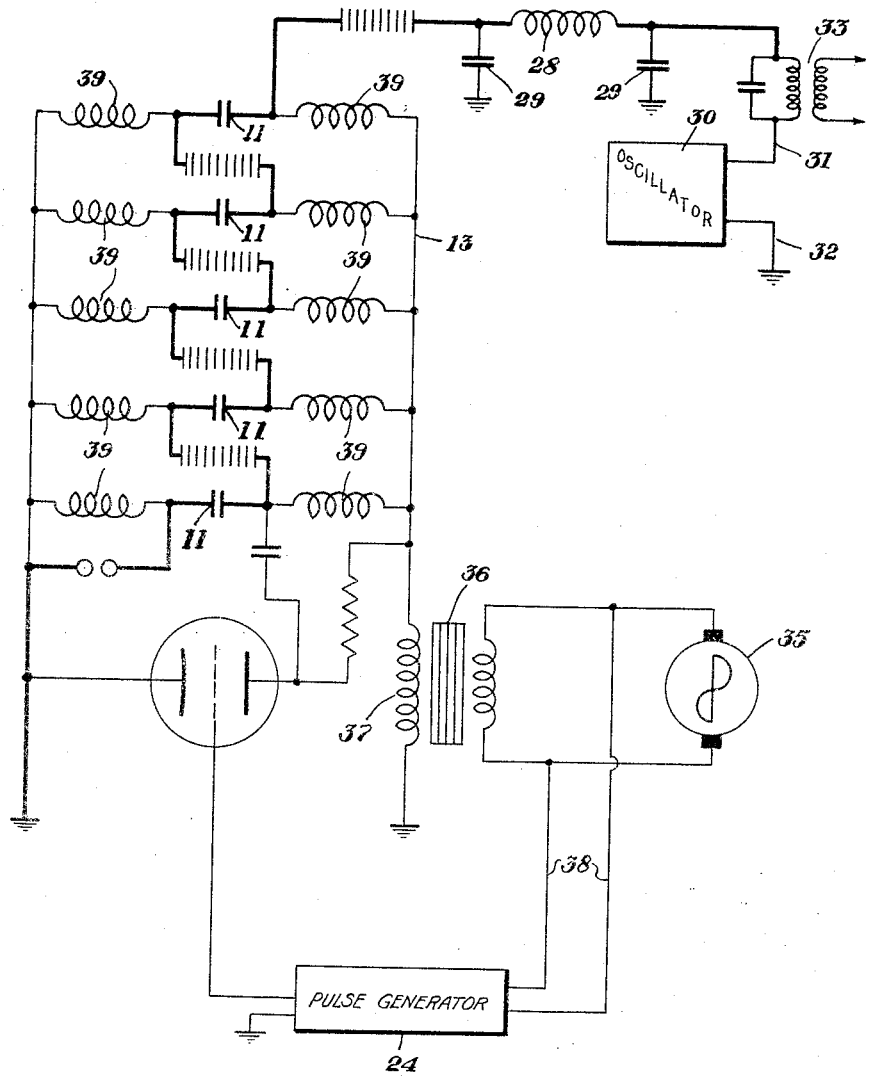

2,419,574

UNITED STATES PATENT OFFICE 2,419,574

IMPULSE GENERATING SYSTEM

Gerard J. Lehmann, New York, N. Y., assignor to International Standard Electric Corporation, New York, N. Y., a corporation of Delaware Application October 30, 1943, Serial No. 508,288

4 Claims. (Cl. 171—97)

1

This invention relates to impulse generating systems and especially to apparatus of this type which includes an arrangement capable of generating pulses having very high instantaneous power values, used for plate modulation of an oscillator, which may be of a type that has recently come into widespread use for certain special purposes.

An object of the invention is to provide a system including a high power pulse generator that does not require the use of generating tubes. This is in general accomplished by utilizing a plurality of spark gap units including condensers which are charged in parallel and discharged in series. A feature of this arrangement is the production of pulses having high voltage and power values from sources having relatively low values.

A further feature is the provision of a modulation system including a spark gap and condenser arrangement adapted to produce discharges at a rate that is in the desired audible frequency range. Other features include uniformity and ready regulation of pulse frequency, and the development of voltage and power substantially beyond maximum requirements.

Other objects and advantages will appear from the following description considered in connection with the accompanying drawings, in which Fig. 1 is a diagram of a system embodying the invention, and Fig. 2 is a diagram of a modification of said system.

The arrangement disclosed in Fig. 1 includes a plurality of spark gaps 10 of the quenched type, connected in series with a condenser 11 preceding each gap. Each condenser 11 is connected across charging lines 12, 13 through resistors 14. Line 12 is grounded, and 13 is connected at B to the positive side of a direct current charging source 15, the negative side of which is also grounded. With this arrangement the condensers 11 are charged in parallel through resistors 14 from source 15, whose potential is relatively high but insufficient to initiate a discharge through the spark gaps 10.

Means is provided for applying to the first condenser 11 a triggering pulse having the proper potential for initiating a discharge through the succeeding spark gap 10. This is conveniently accomplished by utilizing a tube 18 having its cathode 19 connected to line 12 and its anode 20 connected through condenser 21 to the positive side of the first condenser 11, said anode being connected through a suitable resistor 22 to the positive side of source 15. The grid 23 receives

2 triggering impulses at suitable frequency from a pulse generator 24; and one advantage of the disclosed arrangement is the fact that said pulse generator may be of relatively low power.

When a pulse from generator 24 is supplied to grid 23 the corresponding pulse from anode 20 is applied to the first condenser 11, at a voltage sufficient to discharge the condenser through the succeeding spark gap 10. The other condensers 11 are discharged in sequence through the associated spark gaps, providing a cascade pulse of high power and potential. The duration of the discharge is so short that the resistors 14 are adequate to prevent any material interaction with the lines 12, 13.

In order to prevent the current through the condensers and spark gaps from passing through the lowermost resistor 14 to line 12 and ground, a bypass spark gap 26 is connected between the negative side of the first condenser 11 and line 12. The bypass gap does not pass the charging current to the adjacent condenser 11 but provides a low resistance path for the current when the condensers 11 are discharging. With this arrangement the value of condenser 21 may be relatively low, and that of resistor 22 relatively high, tube 18 operating at high impedance and low power.

Pulses generated in the indicated manner have very steep wave fronts, which are objectionable, particularly for modulation; and a suitable network is provided for flattening the front of each pulse wave to the desired slope. In the form illustrated the network includes grounded condensers 27 and an intermediate inductor 28 in the output line 29 from the last spark gap 10. Line 29 is connected to oscillator 30 so as to modulate the oscillator output, being shown as connected to the oscillator anode circuit 31 to provide the anode voltage supply, the pulse circuit being completed by the usual oscillator cathode ground connection 32, the modulated oscillations being transmitted through output transformer 33.

In the arrangement shown in Fig. 1 the charging of condensers 11 is restricted by the use of the resistors 14. This restriction is eliminated in the arrangement illustrated in Fig. 2, in which the condensers 11 are charged by an alternating voltage. In this embodiment the charging voltage is obtained from an alternator 35 through transformer 36 having a secondary winding 37 in line 13, the lower end of the secondary being grounded. The pulse generator 24 is synchronized with alternator 35 in such manner that the condenser discharge will coincide with the start of a charging cycle, suitable synchronizing lead connections 38 being shown. The frequency of the alternator may be the same as that of the pulse generator or a multiple thereof.

In this arrangement the resistors 14 are replaced by choke coils 39, which are designed to isolate the condensers 11 during discharge without interfering materially with the charging of said condensers. They therefore may consist of air core inductors having a small number of turns, offering no material resistance to the charging current. The output inductances of the alternator 35 and of the transformer 36 are designed for resonance with the parallel condenser units, thereby obtaining efficient charging.

With the described arrangements a frequency of 250 pulses per second at exceptionally high voltage and amperage can be obtained, the pulses being of very short duration such as 5 to 7 microseconds. Voltages as high as 90,000 volts and an average value of useful power up to two kilowatts have been obtained. The application of pulses of this type to the modulation of the plate circuit of an oscillator results in the development of powerful impulses in the oscillator output which are of great value for certain purposes. Moreover, the frequency of such impulses is readily controlled and altered, and has a high degree of uniformity.

What is claimed is:

1. A system for generating electrical pulses as set forth in claim 2 comprising a connection between the first condenser in the series and ground, said connection including a spark gap proportioned to prevent current flow during charging and to permit current flow during discharge of the condensers.

2. A system for generating regularly repetitive high voltage electrical pulses comprising a plurality of condensers and discharge devices connected alternately in series, means for charging the condensers to a voltage below the breakdown voltage of said discharge devices including a source of charging energy connected to said condensers in parallel, a source of low voltage electrical triggering pulses, a vacuum tube comprising a cathode, a control grid and an anode, means for connecting said source of low voltage electrical pulses to said grid, and means for connecting said cathode and anode to the respective terminals of one of said condensers.

3. A system for generating electrical pulses as set forth in claim 2, in which said charging source is connected to supply said anode of said vacuum tube with a high potential.

4. A system for generating electrical pulses as set forth in claim 2 in which said charging source comprises a source of alternating current synchronized with said source of low voltage triggering pulses and coupled to the anode of said vacuum tube.

GERARD J. LEHMANN.

REFERENCES CITED

The following references are of record in the file of this patent:

UNITED STATES PATENTS

| Number | Name | Date |
| --- | --- | --- |
| 2,276,994 | Milinowski | Mar. 17, 1942 |
| 2,295,585 | Lindquist | Sept. 15, 1942 |
| 2,032,904 | Bellaschi | Mar. 3, 1936 |
| 2,077,773 | Rorden | Apr. 20, 1937 |
| 2,221,573 | Bruckmann | Nov. 12, 1940 |
| 2,228,070 | Belloschi | Jan. 7, 1941 |
| 2,235,399 | Diehl | Mar. 18, 1941 |